(12) United States Patent
Marchese et al.

(10) Patent No.: US 10,556,338 B1
(45) Date of Patent: Feb. 11, 2020

(54) COMPLIANT FINGER TIP FOR ITEM MANIPULATION

(71) Applicant: Amazon Technologies, Inc., Seattle, WA (US)

(72) Inventors: Andrew D. Marchese, Concord, MA (US); Matthew Michael Budnick, Rutland, MA (US); Ennio Claretti, Somerville, MA (US); Jude Royston Jonas, Hudson, NH (US)

(73) Assignee: Amazon Technologies, Inc., Seattle, WA (US)

(*) Notice: Subject to any disclaimer, the term of this patent is extended or adjusted under 35 U.S.C. 154(b) by 257 days.

(21) Appl. No.: 15/664,839

(22) Filed: Jul. 31, 2017

(51) Int. Cl.
*B25J 9/16* (2006.01)
*B25J 15/06* (2006.01)
*B25J 15/00* (2006.01)
*B25J 15/08* (2006.01)

(52) U.S. Cl.
CPC ......... *B25J 9/1612* (2013.01); *B25J 15/0028* (2013.01); *B25J 15/0616* (2013.01); *B25J 15/08* (2013.01)

(58) Field of Classification Search
CPC .. B25J 9/1612; B25J 15/0028; B25J 15/0616; B25J 15/08; B25J 15/0253; B25J 15/12; B25J 15/0014; G05B 2219/39487; G05B 2219/39485; G05B 2219/39486; G05B 2219/39493; G05B 2219/39513
See application file for complete search history.

(56) References Cited

U.S. PATENT DOCUMENTS

| | | | | |
|---|---|---|---|---|
| 4,591,198 | A * | 5/1986 | Monforte | B25J 13/082 294/119.1 |
| 6,412,844 | B1 * | 7/2002 | Hendzel | B25J 15/08 294/113 |
| 2006/0033350 | A1 * | 2/2006 | Besch | B25B 5/065 294/119.3 |
| 2008/0000203 | A1 * | 1/2008 | Gilmore | B25J 15/0052 53/475 |
| 2009/0097956 | A1 * | 4/2009 | Landes | B65B 35/16 414/788.3 |
| 2010/0078953 | A1 * | 4/2010 | Ban | B25J 15/0266 294/106 |
| 2017/0203443 | A1 * | 7/2017 | Lessing | B25J 15/0014 |
| 2018/0311829 | A1 * | 11/2018 | Curhan | B25J 9/142 |
| 2019/0061170 | A1 * | 2/2019 | Curhan | B25J 15/0023 |
| 2019/0126493 | A1 * | 5/2019 | Jonas | B25J 15/028 |

* cited by examiner

*Primary Examiner* — Dale Moyer
(74) *Attorney, Agent, or Firm* — Kilpatrick Townsend & Stockton LLP

(57) ABSTRACT

Apparatuses including compliant tips and methods of manipulating items using the compliant tips are described herein. An example apparatus may include a robotic manipulator and a pair of end effectors. One end effector may include a pair of actuator-driven fingers that each include a compliant tip. The compliant tips may be used to scoop underneath items as part of item manipulation.

17 Claims, 7 Drawing Sheets

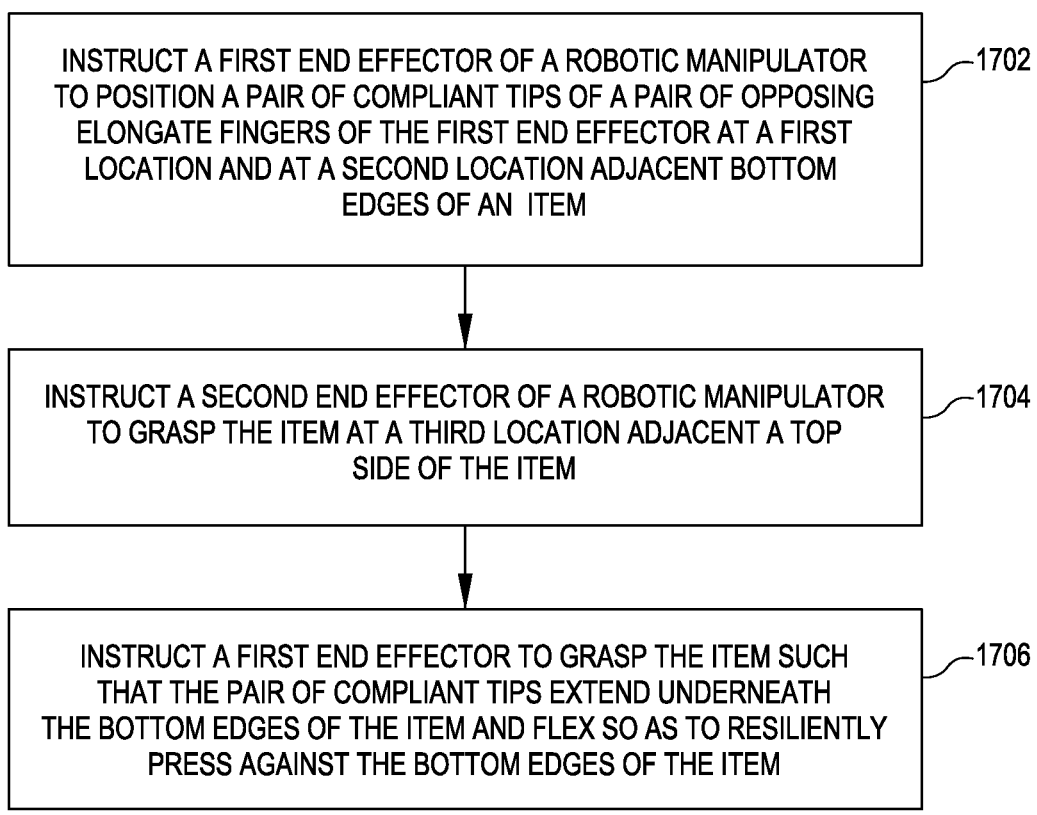

US 10,556,338 B1

COMPLIANT FINGER TIP FOR ITEM MANIPULATION

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators perform tasks under the same conditions. For example, a robotic manipulator may include an end effector that is specialized to grasp a particular class of objects from known or fixed orientations. If different objects (e.g., those having different dimensions, surface properties, and other differences) or objects in unknown orientations are encountered, however, the robotic manipulator may be unable to achieve a grasp. Because of this, other systems that rely on the object being manipulated may be impacted and the benefits of the robotic manipulator may be minimized.

BRIEF DESCRIPTION OF THE DRAWINGS

Various examples in accordance with the present disclosure will be described with reference to the drawings, in which:

FIG. 17 illustrates a flowchart depicting a process for manipulating an item, according to at least one example.

DETAILED DESCRIPTION

Figure 1:
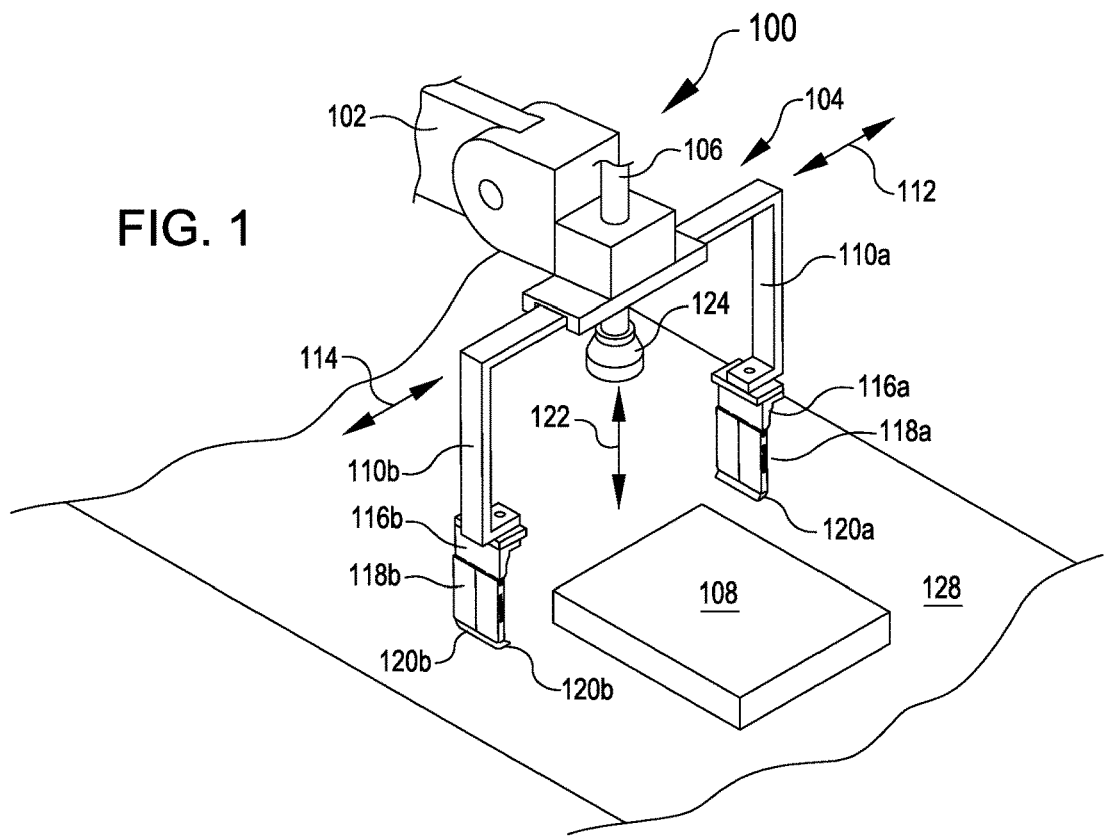
FIG. 1 illustrates a perspective view showing a first state of an item manipulation apparatus including a robotic manipulator and an end effector having a pair of compliant fingers, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to compliant tips that are installed at distal ends of opposing fingers of end effectors of robotic manipulators. The compliant tips can be used on any suitable impactive end effectors that utilize gripper fingers, jaws, claws, or similar structures to physically grasp items. Each compliant tip includes built-in passive or active compliance and a protruding structure at a distal end. The protruding structure is used to scoop underneath items; particularly, those that are supported on other items and/or on planar surfaces. For example, protruding structures on opposing compliant tips are useful for pickup up flat objects such as books from smooth surfaces such as tables or item containers. Placement of the protruding structures underneath the items not only improves the probability that the items will actual be grasped by a robotic manipulator, but also improves the security of the grasps as a robotic manipulator moves the items through the air.

Some inventory systems handle diverse item sets, e.g., dimensions, shapes, weights, surface properties, and characteristics of items may be different. In these systems, use of the compliant tips alone on an end effector or together with other end effectors may increase eligibility (e.g., percentage of inventory that can manipulated by a robotic manipulator) and reliability (e.g., a success rate for manipulating eligible items) as compared to traditional methods that do not utilize the compliant tips.

Turning now to a particular example, a robotic manipulator such as a robotic arm is outfitted with a mechanical gripper end effector and a translating suction end effector. The mechanical gripper end effector can include at least two elongate fingers held in a fixed orientation with respect to each other (e.g., parallel to each other). The translating suction end effector can be mounted between the two elongate fingers. Each elongate finger includes a compliant tip disposed at a distal end of the elongate finger. The compliant tip can be integrated into the distal end of the elongate finger, detachably coupled to the elongate finger, and/or may be included in a compliant finger attachment (e.g., a structure that connects to the elongate finger and includes the compliant tip). In any event, each compliant tip includes a protruding structure (e.g., a curved, sloped, hooked, or otherwise protruding structure) that is oriented towards the other compliant tip. In this manner, the protruding structures of the two compliant tips face each other. The compliant tips include an active mechanism or a passive structure that enables one or more directions of compliance. For example, springs can be biased between the finger attachment and the elongate finger and aligned with a longitudinal axis of the elongate finger. In this arrangement, the spring-loaded joints enable compliance of the compliant tip in a direction along the longitudinal axis. To grasp an item, the compliant tips can be positioned on opposite sides of the item. The elongate fingers can be contracted towards each other until the compliant tips contact bottom edges of the item. This contact can cause the compliant tips to extend underneath the item and flex so as to resiliently press against the item. At about the same time, inner faces of the elongate fingers will contact opposite sides surfaces of the item. When appropriate, the translating suction end effector can be used to provide another grasp along a top surface of the item. In this manner, the item may be mechanically supported by at least three points of contact (e.g., the two opposite side surfaces and the top surface) and possibly five points of contact (e.g., two points on a bottom side surface, the two opposite side surfaces, and the top surface). Such mechanical contact has shown dramatic increases in eligibility and reliability with respect to diverse item sets as compared to grippers without compliant tips.

Figure 2:
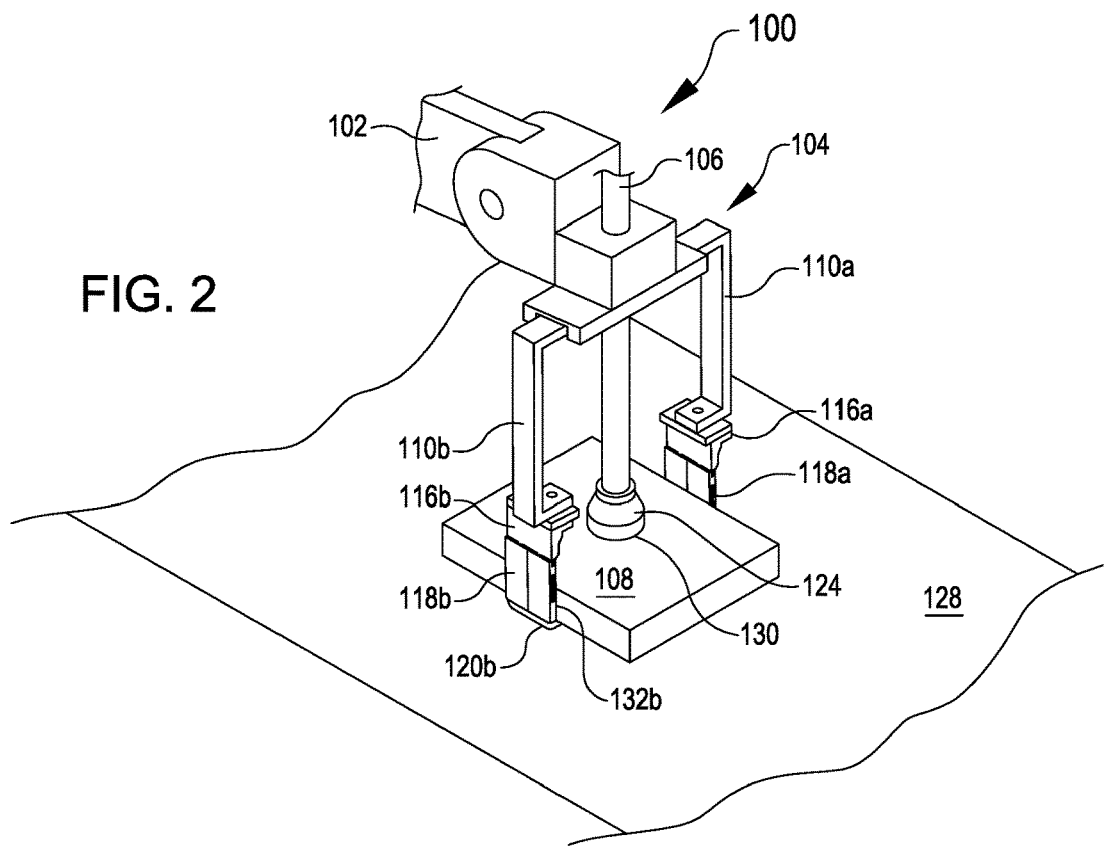
FIG. 2 illustrates a perspective view showing a second state of the item manipulation apparatus of FIG. 1, according to at least one example.

Turning now to the figures, FIGS. 1 and 2 illustrate an item manipulation apparatus 100, according to various examples. The item manipulation apparatus 100 includes a robotic manipulator 102 (a distal portion of which is illustrated), a first end effector 104, and a second end effector 106. In FIG. 1, the item manipulation apparatus 100 is illustrated in a first state. In FIG. 2, the item manipulation apparatus 100 is illustrated in a second state.

The robotic manipulator 102 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, gantries, overhead lift modules, and any other suitable material handling equipment that interacts with or otherwise handles objects) that is operable by a management device (e.g., a computing device or other electronic controller).

The robotic manipulator 102 may include any suitable type and number of sensors disposed throughout the robotic manipulator 102 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 102, including the end effectors 104, 106. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 102, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum or suction end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The management device may be configured to manage the operation of the robotic manipulator 102 (e.g., moving the robotic manipulator through different poses and orientations), the first end effector 104 (e.g., causing the first end effector 104 to grasp an item 108), and the second end effector 106 (e.g., causing the second end effector 106 to grasp the item 108). In some examples, the management device can be distributed at one or more locations. For example, a first management device may be local to the robotic manipulator 102 and include hardware and firmware and a second management device may be remote from the robotic manipulator 102 and include software. The management device may include any suitable combination of software, firmware, processors, memory modules, specialized chips, sensors, and the like to implement the techniques described herein. In some examples, the management device receives instructions over a network from a server to perform the techniques described herein.

The items 108 can be any suitable object capable being manipulated by the item manipulation apparatus 100. Depending on the system in which the item manipulation apparatus 100 is implemented, the items 108 may represent a wide variety of different items having different characteristics. The items 108 may include, for example, personal electronic devices, computers, recreational equipment, food products, television sets, clothing, household supplies, automotive parts, appliances, books, and any other suitable object capable of being manipulated by the item manipulation apparatus 100.

The first end effector 104 includes a first arm 110a and a second arm 110b. The arms 110 are moveable towards each other and away from each other, as indicated by arrows 112 and 114. For example, the first end effector 104 can include one or more actuators or other suitable drive mechanisms to cause the movement illustrated by arrows 112 and 114. In some examples, the arms 110 can be moved independently of each other (e.g., the arm 110a can be moved while the second arm 110b remain fixed).

The first end effector 104 also includes a first finger 116a and a second finger 116b. The fingers 116 are moveable towards each other and away from each other, as indicated by arrows 112 and 114, by virtue of their connections to the arms 110. The fingers 116 can be detachably coupled to the arms 110 in any suitable manner (e.g., nuts and bolts, pop rivets, interference fit, and any other means for coupling). In some examples, the fingers 116 are integrated into the arms 110, and may be replaceable or not. For example, Thus, the fingers 116 and the arms 110 may be formed as single units. The fingers 116 may be formed from a rigid material such as aluminum, steel, titanium, reinforced polymers, plastic, and any other suitable material. In some examples, the fingers 116 are extendable and retractable (e.g., via a telescoping mechanism).

The first end effector 104 also includes a first compliant finger attachment 118a and a second compliant finger attachment 118b. At distal ends, each compliant finger attachment 118 includes a compliant tip 120 (e.g., a first compliant tip 120a and a second compliant tip 120b). The compliant finger attachments 118 may be used to connect the fingers 116 and the compliant tips 120. The compliant finger attachments 118 can be detachably coupled to the fingers 116 in any suitable manner. In some examples, the compliant finger attachments 118 are integrated into the fingers 116. The compliant tips 120 can be detachably coupled to the compliant finger attachments 118 in any suitable manner (e.g., nuts and bolts, pop rivets, tongue and groove, interference fit, and any other means for coupling). In some examples, the compliant tips 120 are integrated into the compliant finger attachments 118, and may be replaceable or not.

Compliance of the compliant tips 120 may be achieved passively and/or actively. In some examples, the finger attachments 118 contribute to the compliance of the compliant tips 120. For example, the finger attachments 118 can include elements to create compliance between the finger attachments 118 and the fingers 116. In some examples, the compliance of the compliant tips 120 and/or the finger attachments 118 is achieved by building active or passive compliance into the arms 110. For example, the compliant tips 120 and/or the finger attachments 118 can be more or less rigid and the arms 110 can include springs or other features to flex or otherwise comply to the conditions encountered by the compliant tips 120 and the finger attachments 118.

In some examples, the compliant tips 120 and/or the finger attachments 118 may have characteristics of a compliant actuator. A compliant actuator may allow deviations from its own equilibrium position, depending on the applied external force or force applied by an active mechanism. The equilibrium position of a compliant actuator may be defined as the position of the actuator where the actuator generates zero force or zero torque. Compliance is the opposite of stiffness. Thus, a stiff or rigid actuator may be one which does not deviate from its own equilibrium position. In some examples, actuators may have variable stiffness, adjustable stiffness, and/or controllable stiffness. Examples of compliant actuators include passive compliant actuators that contain an elastic or motive element, e.g. a spring which can store energy. Examples of compliant actuators also include those with active compliance, where a mechanism of an otherwise stiff actuator mimics the behavior of the elastic or motive element. In some examples, active compliance can be tuned during normal operation.

The second end effector 106 is disposed between the two arms 110. The second end effector 106 is an example of a translating suction end effector. Thus, in operation, the second end effector 106 may translate in the directions of arrow 122 (e.g., away from and towards the item 108). The second end effector 106 includes a suction head 124 at a distal end. The suction head 124 is moveable into and out of engagement with the items 108.

FIG. 1 illustrates a first state of the item manipulation apparatus 100. In this first state, the item manipulation apparatus 100 is preparing to manipulate the item 108. In particular, the item manipulation apparatus 100 is preparing to grasp the item 108 and remove the item 108 from a surface 128. Thus, the arms 110 have been moved out and the suction head 124 of the second end effector 106 has been retracted. The robotic manipulator 102 has moved the first end effector 104 and the second end effector 106 into the orientation illustrated in FIG. 1.

The surface 128 may be any suitable container, surface, item, or other suitable object on which the items 108 may rest. For example, the surface 128 may include an item container from which the items 108 (e.g., similar items or different items) are picked from the item container by the robotic manipulator 102 using techniques described herein. In an additional example, the surface 128 may support a pile of items 108 from which the items 108 (e.g., similar items or different items) are picked from the pile by the robotic manipulator 102 using techniques described herein.

FIG. 2 illustrates a second state of the item manipulation apparatus 100. In this second state, the item manipulation apparatus 100 has used the first end effector 104 and the second end effector 106 to grasp the item 108. This is shown by the suction head 124 contacting the item 108 at a first location 130 on a top surface of the item 108, the second compliant finger attachment 118b contacting the item 108 at a second location 132b on a side surface of the item, and the first compliant finger attachment 118 contacting the item 108 at a third location opposite the second location 132b on an opposite side surface of the item 108. In some examples, the compliant tips 120 also contact the item 108 at fourth and fifth locations on a bottom side of the item 108.

In some examples, intermediate to the first state and the second state, the compliant tips 120 are brought into contact with the surface 128 and brought towards each other to pinch the item 108. In some examples, this may result in the compliant tips 120 being used to scoop underneath the item 108. At or about the same time, at a later time, or at an earlier time, the second end effector 106 can be used to grasp the item 108 and lift the item 108 slightly. This may enable the compliant tips 120 to underneath bottom edges the item 108 and flex so as to press against the bottom edges of the item 108.

Figure 3:
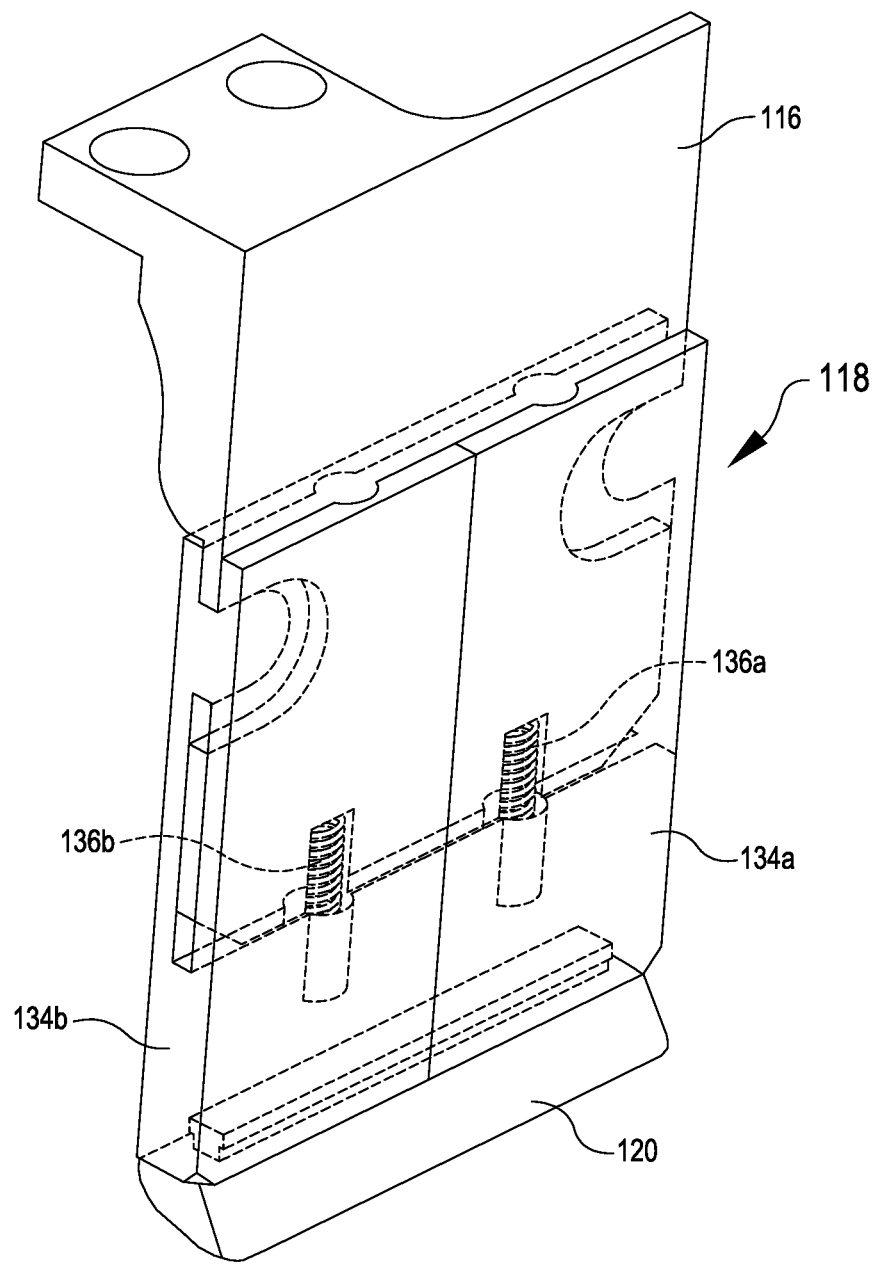
FIG. 3 illustrates a perspective view showing a finger and a compliant finger attachment, according to at least one example.
Figure 4:
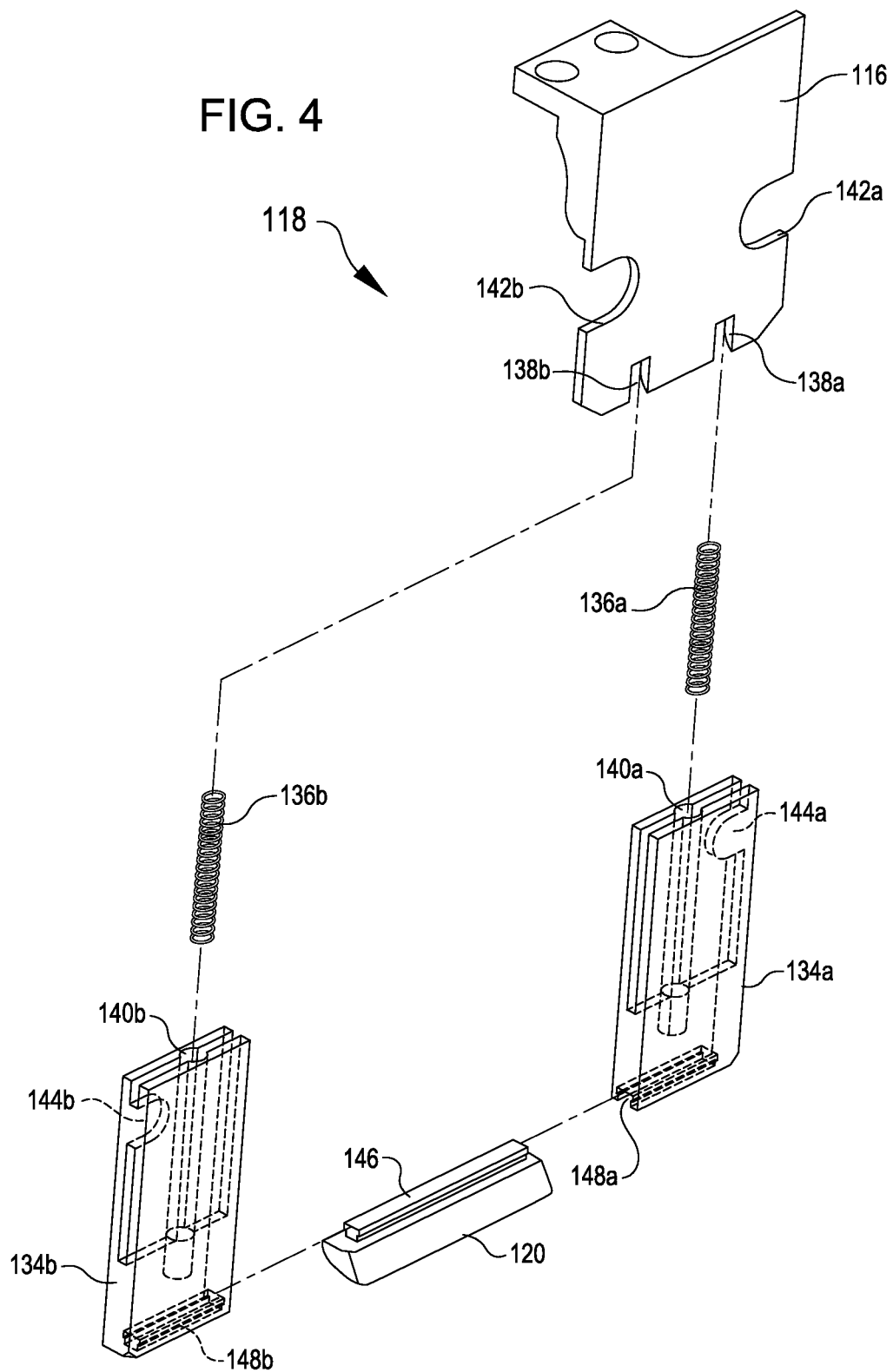
FIG. 4 illustrates an exploded view showing the finger and the compliant finger attachment of FIG. 3, according to at least one example.

FIGS. 3 and 4 illustrate the finger 116 and the compliant finger attachment 118 including the compliant tip 120. In some examples, the compliance of a combined system that includes the compliant finger attachment 118 and the compliant tip 120 may be achieved at least in part via compliance of the compliant finger attachment 118 and/or compliance of the compliant tip 120. For example, as illustrated in FIGS. 3 and 4, the compliant finger attachment 118, which includes a first compliant finger attachment part 134a and a second compliant finger attachment part 134b, is moveably coupled to the finger 116 via a first spring 136a and a second spring 136b. The addition of the springs 136 between the compliant finger attachment 118 and the finger 116 enables compliance of the compliant finger attachment 118. In particular, the springs 136 are biased between finger grooves 138a, 138b, and attachment grooves 140a, 140b.

The finger 116 includes a pair of arcuate cutouts 142a, 142b. The arcuate cutouts 142 correspond in shape and size to a pair of arcuate tabs 144a, 144b disposed inside the compliant finger attachment 118. In the assembled state of FIG. 3, the arcuate tabs 144 extend within the arcuate cutouts 142. Also, in the assembled state of FIG. 3, the springs 136 are compressed. With this arrangement, the compliant finger attachment 118 is capable of providing at least the compliance illustrated by FIGS. 5 and 6. For example, the compliant finger attachment 118 can mechanically compensate for misalignment between the robotic manipulator 102 and the surface 128.

Figure 5:
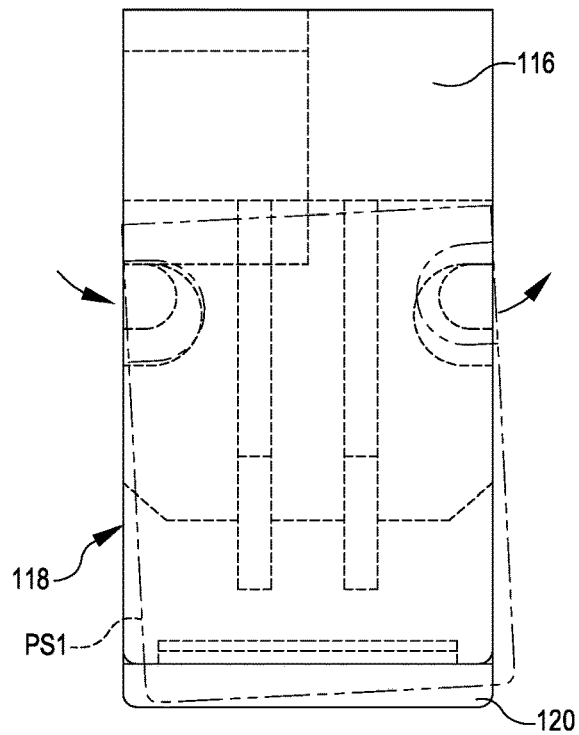
FIG. 5 illustrates a front view showing the finger and the compliant finger attachment of FIG. 3 in a first orientation, according to at least one example.

For example, as illustrated in FIG. 5, because of the configuration of the compliant finger attachment 118, when the compliant tip 120 contacts a surface that is uneven (e.g., not parallel to a distal, lower edge of the compliant tip 120), the compliant finger attachment 118 can compress the springs 136 and slightly rotate in a first direction (e.g., counterclockwise) to an orientation shown by phantom line PS1.

Figure 6:
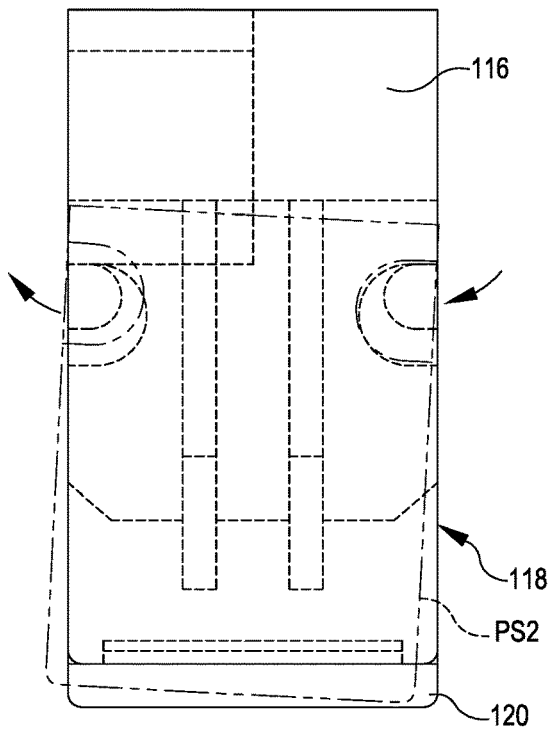
FIG. 6 illustrates a front view showing the finger and the compliant finger attachment of FIG. 3 in a second orientation, according to at least one example.

Similarly, as illustrated in FIG. 6, because of the configuration of the compliant finger attachment 118, when the compliant tip 120 contacts a surface that is uneven (e.g., not parallel to a distal, lower edge of the compliant tip 120), the compliant finger attachment 118 can compress the springs 136 and slightly rotate in a second direction (e.g., clockwise) to an orientation shown by phantom line PS2.

If the compliant tip 120 were to contact a parallel surface, both springs 136 will compress evenly and the compliant tip 120 and the compliant finger attachment 118 will translate together (e.g., up in FIGS. 5 and 6). Thus, the configuration of the compliant finger attachment 118 may enable compliance in a direction that corresponds to a longitudinal axis of the finger 116 (e.g., a longest dimension of the finger 116).

In some examples, instead of or in addition to the springs 136, the compliant finger attachment 118 may include a set of magnets disposed between the compliant tip 120 and the finger 116, a first actuator rod attached to the compliant tip 120, a cam to direct movement of the compliant tip 120 when actuated by a second actuator rod, or a pneumatic air source connected to an air chamber of the compliant tip 120.

Returning to FIG. 4, in this figure, the compliant tip 120 is shown including a tongue 146. The tongue 146 corresponds to grooves 148a, 148b on the first finger attachment part 134a and the second finger attachment part 134b. The combination of the tongue 146 and the grooves 148 enable the compliant tip 120 to be removable and replaceable from the compliant finger attachment 118. This may be desirable because the compliant tip 120, being at the distal end, is subject to more wear and tear than other parts of the compliant finger attachment 118. Because of this, the compliant tip 120 may wear out sooner than the compliant finger attachment 118. Other structures may be used to enable replaceability of the compliant tip 120.

Figure 7:
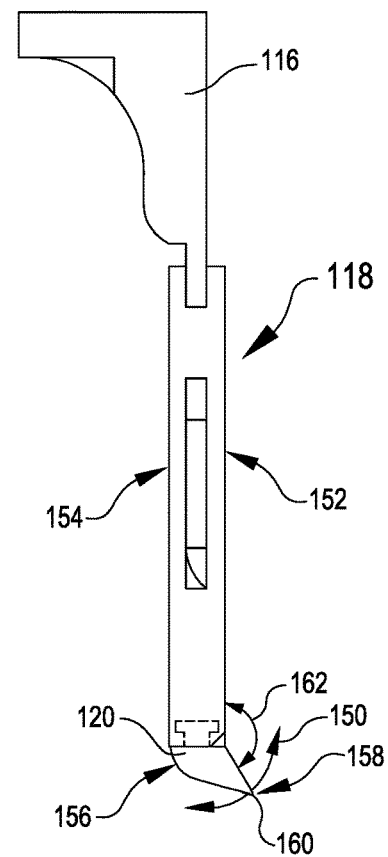
FIG. 7 illustrates a side view showing the finger and the compliant finger attachment of FIG. 3, according to at least one example.

FIG. 7 illustrates a side view of the finger 116, the compliant finger attachment 118, and the compliant tip 120. The compliant finger attachment 118 is defined by an inward-facing surface 152 and an outward-facing surface 154. In some examples, the compliant tip 120 and the compliant finger attachment 118 may be formed from different materials, which may be selected to correspond to different functions of the different parts. For example, the compliant tip 120 may be formed from a hard material with a low coefficient of friction to enable sliding of the compliant tip 120 across surfaces. The compliant finger attachment 118 may be formed from a less hard material with a higher coefficient of friction to provide for high friction when grasping items 108. In some examples, the inward-facing surface 152 and/or a similar surface of the fingers 116 may be coated with a material having a high coefficient of friction to provide for high friction when grasping the items 108.

As illustrated by arrow 150, the compliant tip 120 may extend inwardly (e.g., toward the inward-facing surface 152) and may be flexed outwardly (e.g., toward the outward-facing surface 154). For example, the compliant tip 120 may flex outwardly when executing a grasp so as to resiliently press against bottom edges of the item 108. In this manner, the compliant tip 120 may flex so as to be substantially collinear with the finger 116. In some examples, the compliant tip 120 may be capable of flexing at least because it is formed from a resilient material (e.g., rubber, polymers, and/or other similar materials). In some examples, the compliant tip 120 may include one or more live hinges such that the compliant tip 120 may predictively deform. For example, a live hinge may be included at an outward-facing portion 156 of the compliant tip 120. In some examples, a live hinge may be included at an inward-facing portion 158 of the compliant tip 120.

In some examples, in addition to or instead of the compliant tip 120 flexing inwardly and/or outwardly, the compliant finger attachment 118 may flex inwardly and outwardly with respect to the finger 116. For example, the compliant finger attachment 118 may flex outwardly when executing a grasp so as to resiliently press against opposing side surfaces and/or edges of the item 108. In this manner, the compliant finger attachment 118 may flex so as to be substantially collinear with the fingers 116.

In some examples, the inward-facing portion 158 may be defined as a protrusion, a curved tip, a hook-shaped tip, a prism-shaped hook, and any other suitable structure having a protruding shape. The inward-facing portion 158 may extend between the inward-facing surface 152 and a distal edge 160 of the compliant tip 120. The inward-facing portion 158 may be defined as a contact surface for contacting the item 108 when the items 108 are manipulated. The outward-facing portion 156 may extend between the outward-facing surface 154 and the distal edge 160 of the compliant tip 120. The distal edge 160 may be formed into a point and the inward-facing portion 158 may taper between the distal edge 160 and the inward-facing surface 152.

The inward-facing portion 158 may be defined by an angle 162 extending between the inward-facing surface 152 and a top surface of the inward-facing portion 158 (e.g., a portion that extends between the distal edge 160 and the inward facing surface 152). The angle 162 may range between 45 degrees and 180 degrees. In some examples, the angle 162 may be less than 45 degrees or more than 180 degrees. The angle 162 may be selected based on the items 108 to be manipulated by the end effectors 104 and 106. In some examples, the compliant tip 120 may be a hybrid tip in that it is composed of different materials having different characteristics. For example, the inward-facing portion 158 may be formed from a first material and the outward-facing portion 156 may be formed from a second material.

Figure 8:
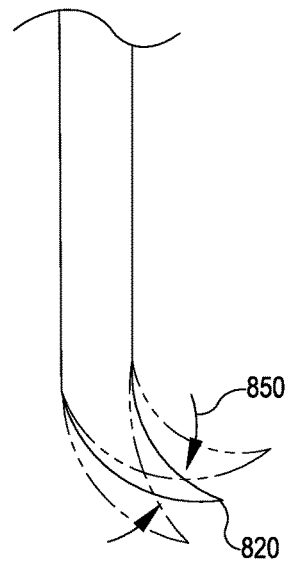
FIG. 8 illustrates a side view showing a compliant tip, according to at least one example.

FIGS. 8-16 illustrate side views of various compliant tips, according to a few examples. In FIG. 8, a compliant tip 820 is illustrated. The compliant tip 820 is an example of the compliant tip 120. The compliant tip 820 may be resilient to flex in the directions illustrated by arrow 850. In some examples, the compliant tip 820 may be capable of flexing as a result of the material from which the compliant tip 820 is formed (e.g., a resilient material), the presence of a live hinge, the presence of a ratchet, and/or the presence of some other structure.

Figure 9:
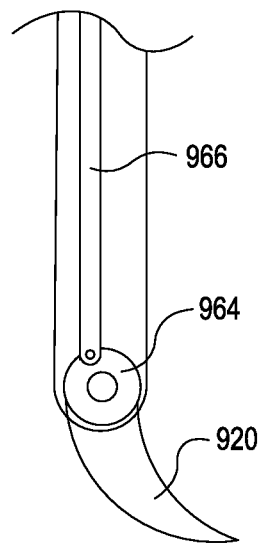
FIG. 9 illustrates a side view showing a compliant tip in a first state, according to at least one example.
Figure 10:
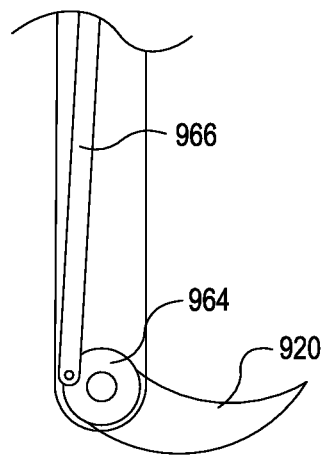
FIG. 10 illustrates a side view showing the compliant tip of FIG. 9 in a second state, according to at least one example.

In FIGS. 9 and 10, a compliant tip 920 is illustrated respectively in a first state (e.g., a retracted state) and a second state (e.g., an extended state). The compliant tip 920 is an example of the compliant tip 120. The compliant tip 920 includes a hinge 964 and a rod 966. The rod 966 and the hinge 964 together enable actuation of the compliant tip 920 between the different states. In this manner, the compliant tip 920 may be actively actuated (e.g., by pushing and pulling the rod 966, which may be performed by an automated actuator).

Figure 11:
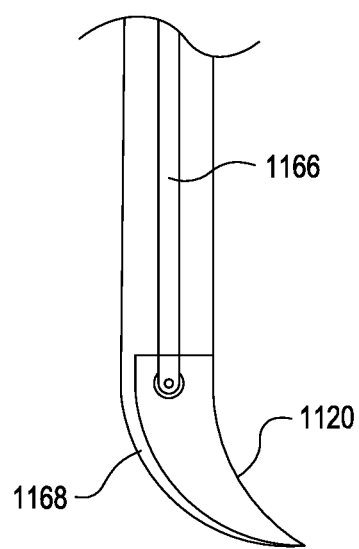
FIG. 11 illustrates a side view showing a compliant tip in a first state, according to at least one example.
Figure 12:
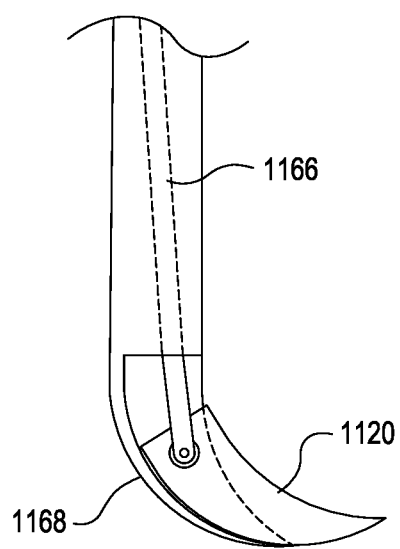
FIG. 12 illustrates a side view showing the compliant tip of FIG. 11 in a second state, according to at least one example.

In FIGS. 11 and 12, a compliant tip 1120 is illustrated respectively in a first state (e.g., a retracted state) and a second state (e.g., an extended state). The compliant tip 1120 is an example of the compliant tip 120. The compliant tip 1120 includes a rod 1166 and a cam 1168. The rod 1166 and the cam 1168 together enable actuation of the compliant tip 1120 between the different states. In this manner, the compliant tip 1120 may be actively actuated (e.g., by pushing and pulling the rod 1166, which may be performed by an automated actuator).

Figure 13:
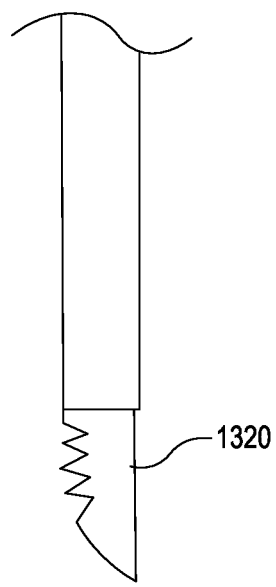
FIG. 13 illustrates a side view showing a compliant tip in a first state, according to at least one example.
Figure 14:
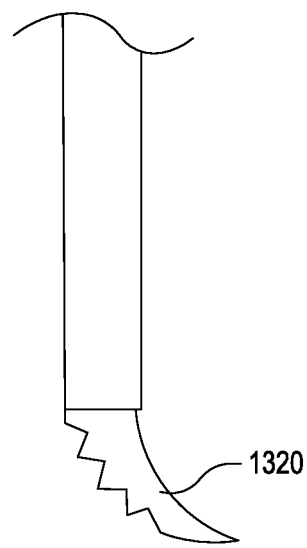
FIG. 14 illustrates a side view showing the compliant tip of FIG. 13 in a second state, according to at least one example.

In FIGS. 13 and 14, a compliant tip 1320 is illustrated respectively in a first state (e.g., a retracted state) and a second state (e.g., an extended state). The compliant tip 1320 is an example of the compliant tip 120. The compliant tip 1320 may be considered a soft hinge and include an interior air chamber. The compliant tip 1320 may be actuated by selectively pressurizing and depressurizing the interior air chamber. In this manner, the compliant tip 1320 may be actively actuated.

Figure 15:
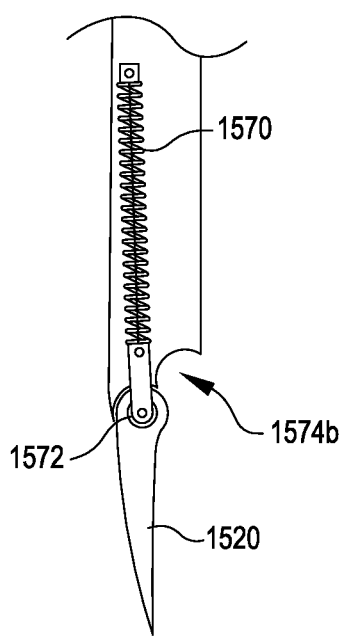
FIG. 15 illustrates a side view showing a compliant tip in a first state, according to at least one example.
Figure 16:
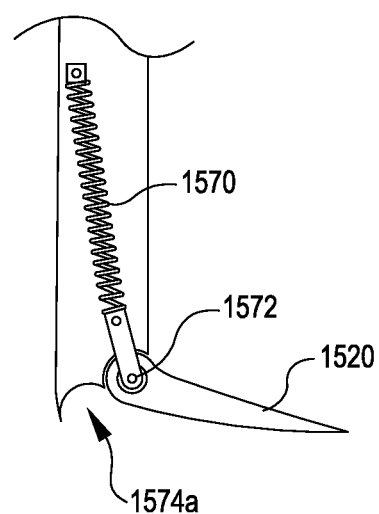
FIG. 16 illustrates a side view showing the compliant tip of FIG. 15 in a second state, according to at least one example.

In FIGS. 15 and 16, a compliant tip 1520 is illustrated respectively in a first state (e.g., a retracted state) and a second state (e.g., an extended state). The compliant tip 1520 is an example of the compliant tip 120. The compliant tip 1520 includes a spring 1570 connected to a hinge 1572. Adding tension to the spring 1572 may cause the compliant tip 1520 to move from a first groove 1574a to a second groove 1574b. Releasing tension on the spring 1572 may cause the compliant tip 1520 to move from the second groove 1574b to the first groove 1574a.

FIG. 17 illustrates an example flow diagram showing a process 1700 as described herein. The process 1700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 17 illustrates a flow diagram depicting the process 1700 for implementing techniques relating manipulating an item, according to at least one example. The management device of the item manipulation apparatus 100 may perform the process 1700.

The process 1700 may begin at 1702 by instructing a first end effector of a robotic manipulator to position a pair of compliant tips of a pair of opposing elongate fingers of the first end effector at a first location and at a second location adjacent a bottom edge of an item. In some examples, each compliant tip of the pair of compliant tips may include an inward-facing protruding structure that is biased towards the other compliant tip.

In some examples, instructing the first end effector to grasp the item further includes instructing the first end effector to grasp the item such that the pair of opposing elongate fingers of the first end effector contact opposing side surfaces of the item adjacent to the first location and the second location.

At 1704, the process 1700 may include instructing a second end effector of the robotic manipulator to grasp the item at a third location adjacent a top side the item.

At 1706, the process 1700 may include instructing the first end effector to grasp the item such that the pair of compliant tips extend underneath bottom edges of the item and flex so as to resiliently press against the bottom edges of the item.

In some examples, grasping the item at the top surface of the item and contacting the item at the opposing side surfaces of the item forms a tripartite grasp of the item. The tripartite grasp may be defined as at least three points of contact on the item.

In some examples, the second end effector is a translating suction end effector. In this example, instructing the second end effector to grasp the item at the third location may include instructing translation of the translating suction end effector at least until a suction end contacts the item at the third location and suctioning of the suction end at the third location.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus, comprising:
   a robotic manipulator;
   a first end effector connected to the robotic manipulator and configured to grasp an item using a first grasping function; and
   a second end effector connected to the robotic manipulator and configured to grasp the item using a second grasping function, the second end effector comprising:
      a first elongate finger comprising a first finger attachment connected to the first elongate finger via one or more biased members, with a first protruding tip connected to the first finger attachment at a distal end of the first finger attachment, wherein at least one of the first finger attachment or the first protruding tip deviates from an equilibrium position when an external force is applied at a distal end of the first protruding tip; and
      a second elongate finger being opposite the first elongate finger and comprising a second protruding tip disposed at a distal end of the second elongate finger, the first protruding tip and the second protruding tip protruding towards each other, the first elongate finger and the second elongate finger being slidably mounted relative to each other such that the first elongate finger and the second elongate finger are moveable towards each other and away from each other, wherein when the first elongate finger and the second elongate finger are moved towards each other:
the first elongate finger and the second elongate finger contact opposite surfaces of the item; and
the first protruding tip and the second protruding tip extend underneath bottom edges of the item.

2. The apparatus of claim 1, wherein the first protruding tip and the second protruding tip are formed from a first material, and the first elongate finger and the second elongate finger are formed from a second material different than the first material.

3. The apparatus of claim 1, wherein the first protruding tip comprises:
an inward-facing protrusion, a profile of the inward-facing protrusion tapering with respect to an increase in a transverse distance from the first elongate finger to a distal end of the inward-facing protrusion; and
a curved rear portion defined as extending between a rear surface of the first elongate finger and an underside of the inward-facing protrusion.

4. The apparatus of claim 1, further comprising:
a management device in communication with the robotic manipulator, the first end effector, and the second end effector, the management device configured to at least:
instruct the robotic manipulator to position the first end effector and the second end effector above the item;
instruct the first end effector to use the first grasping function to grasp the item at a first location defined at a top portion of the item; and
instruct the second end effector to use the second grasping function to grasp the item at a second location and a third location defined at opposing side surfaces of the item such that the first protruding tip and the second protruding tip extend underneath opposing bottom edges of the item and flex so as to resiliently press against the bottom edges of the item.

5. An apparatus, comprising:
a robotic manipulator;
a first end effector connected to the robotic manipulator and configured to grasp an item using a first grasping function; and
a second end effector connected to the robotic manipulator and configured to grasp the item using a second grasping function, the second end effector comprising:
a pair of elongate fingers disposed opposite each other;
a pair of compliant tips, each one of the compliant tips connected to one of the pair of elongate fingers, a first compliant tip of the pair of compliant tips comprising a first opposing protrusion disposed at a distal end of the first compliant tip, a profile of the first opposing protrusion tapering with respect to an increase in a transverse distance from a first elongate finger of the pair of elongate fingers to a distal end of the first opposing protrusion; and
one or more actuators configured to drive the pair of elongate fingers such that the pair of compliant tips contact opposing bottom edges of the item when the second end effector uses the second grasping function to grasp the item.

6. The apparatus of claim 5, wherein the first opposing protrusion is biased toward a second opposing protrusion of a second compliant tip of the pair of compliant tips.

7. The apparatus of claim 5, wherein the first compliant tip of the pair of compliant tips is detachably coupled to the first elongate finger of the pair of elongate fingers.

8. The apparatus of claim 5, further comprising a pair of finger attachments connected to the pair of elongate fingers, with the pair of compliant tips connected to the finger attachments at distal ends of the pair of finger attachments.

9. The apparatus of claim 8, wherein a first finger attachment of the pair of finger attachments is detachably coupled to the first elongate finger of the pair of elongate fingers via one or more biased members such that at least one of the first finger attachment or the first compliant tip of the pair of compliant tips deviates from an equilibrium position when an external force is applied at the distal end of the first compliant tip.

10. The apparatus of claim 5, wherein the first compliant tip of the pair of compliant tips is moveable between a first state and a second state.

11. The apparatus of claim 10, wherein:
the first compliant tip is flexed into the second state by at least one of:
an external force acting on the first compliant tip that causes localized deformation of a portion of the first compliant tip; or
a mechanism of the second end effector acting on the first compliant tip, the mechanism comprising at least one of a spring connected to the first compliant tip, a set of magnets disposed between the first compliant tip and the first elongate finger of the pair of elongate fingers, a first actuator rod attached to the first compliant tip, a cam to direct movement of the first compliant tip when actuated by a second actuator rod, or a pneumatic air source connected to an air chamber of the first compliant tip.

12. The apparatus of claim 5, wherein:
the first end effector uses the first grasping function to grasp the item at a first location defined at a top portion of the item; and
the second end effector uses the second grasping function to grasp the item at a second location and a third location defined at opposing side portions of the item such that the pair of elongate fingers contact the item at the second location and the third location and the pair of compliant tips extend underneath opposing bottom edges of the item and flex so as to resiliently press against the bottom edges of the item.

13. The apparatus of claim 12, wherein grasping at the first location, the second location, and the third location forms a tripartite grasp of the item.

14. A computer-implemented method, comprising:
instructing a first end effector of a robotic manipulator to position a pair of compliant tips of a pair of opposing elongate fingers of the first end effector at a first location and at a second location adjacent bottom edges of an item, each compliant tip of the pair of compliant tips comprising:
an inward-facing protrusion that is biased towards the other compliant tip, a profile of the inward-facing protrusion tapering with respect to an increase in a transverse distance from a respective elongate finger to a respective distal end of the inward-facing protrusion; and a curved rear portion defined as extending between a rear surface of the respective elongate finger and an underside of the inward-facing protrusion;

instructing a second end effector of the robotic manipulator to grasp the item at a third location adjacent a top side the item; and instructing the first end effector to grasp the item such that respective inward-facing protrusions of the pair of compliant tips extend underneath the bottom edges of the item and flex so as to resiliently press against the bottom edges of the item.

15. The computer-implemented method of claim 14, wherein instructing the first end effector to grasp the item further comprises instructing the first end effector to grasp the item such that the pair of opposing elongate fingers of the first end effector contact opposing side surfaces of the item adjacent to the first location and the second location.

16. The computer-implemented method of claim 15, wherein grasping the item at the third location adjacent the top side of the item and contacting the opposing side surfaces of the item adjacent to the first location and the second location together forms a tripartite grasp of the item.

17. The computer-implemented method of claim 14, wherein:

the second end effector is a translating suction end effector; and instructing the second end effector to grasp the item at the third location comprises instructing:

translation of the translating suction end effector at least until a suction end contacts the item at the third location; and suctioning of the translating suction end effector at the third location.

* * * * *